United States Patent [19]

Hempel et al.

[11] Patent Number: 4,821,209
[45] Date of Patent: Apr. 11, 1989

[54] DATA TRANSFORMATION AND CLIPPING IN A GRAPHICS DISPLAY SYSTEM

[75] Inventors: Bruce C. Hempel, Tivoli; Bob C. Liang, West Hurley, both of N.Y.

[73] Assignee: International Business Machines Corporation, Armonk, N.Y.

[21] Appl. No.: 821,363

[22] Filed: Jan. 21, 1986

[51] Int. Cl.$^4$ .................. G06F 15/68; G06F 15/72
[52] U.S. Cl. .................. 364/518; 340/723; 340/727; 340/747; 340/750; 434/43
[58] Field of Search ........... 364/518, 521, 522, 523, 364/300; 340/723, 721, 724, 727, 726, 734, 747, 750; 434/43

[56] References Cited

U.S. PATENT DOCUMENTS

| | | | |
|---|---|---|---|
| 4,449,201 | 5/1984 | Clark | 364/900 |
| 4,623,880 | 11/1986 | Bresenham et al. | 340/723 |
| 4,625,289 | 11/1986 | Rockwood | 364/522 |
| 4,631,690 | 12/1986 | Gorthout et al. | 364/518 |
| 4,642,790 | 2/1987 | Minshull et al. | 364/900 |
| 4,645,459 | 2/1987 | Graf et al. | 434/43 |
| 4,646,075 | 2/1987 | Andrews et al. | 340/747 |
| 4,651,278 | 3/1987 | Herzog et al. | 364/300 |
| 4,667,190 | 5/1987 | Fant | 340/727 |
| 4,679,038 | 7/1987 | Bantz et al. | 340/721 |

*Primary Examiner*—Gary V. Harkcom
*Assistant Examiner*—Randy W. Lacasse
*Attorney, Agent, or Firm*—George E. Clark; Joseph J. Connerton

[57] ABSTRACT

A display processor in a raster graphics display system includes a transformation, clipping and mapping feature which controls the transformation, clipping and mapping of graphics data. A control byte contains 5 bits identified as: M—Window to viewport mapping; P—perspective projection; D—2D/3D mode; T—transformation; and C—clipping. Each bit in the control byte is tested to determine what operations are to be performed on the figure to be drawn.

7 Claims, 8 Drawing Sheets

LOGICAL DATA FLOW OF THE GRAPHICS SYSTEM

FIG.1
A RASTER GRAPHICS SYSTEM

FIG. 2  DISPLAY PROCESSOR

FIG.3
LOGICAL DATA FLOW OF THE GRAPHICS SYSTEM

FIG.4 TRANSFORMATION AND CLIPPING CONTROL FLOW

FIG.5a

FIG. 6   LOGICAL FLOW CHART FOR CTCF

FIG. 7 FLOW CHART FOR PROCESSING VECTOR

DATA TRANSFORMATION AND CLIPPING IN A GRAPHICS DISPLAY SYSTEM

BACKGROUND OF THE INVENTION

1. Field of the Invention

The present invention relates to information handling systems and more particularly to information handling systems including method and apparatus for transforming and clipping data representations of lines to be drawn on a graphics display.

2. Description of the Prior Art

The following are systems representative of the prior art.

"Fundamentals of Interactive Computer Graphics" by Foley and Van Dam, published by Addison, Wesley Publishing Company, 1982, at Chapters 2, 7, 8, 9, 10, and 11 discusses transformation, clipping and mapping in graphics display systems.

However, the text does not teach or suggest the method and apparatus for transformation, clipping and mapping graphics data in accordance with the present invention.

Bresenham in a article entitled "Algorithm for Computer Control of Digital Plotter", IBM System Journal, Vol. 4 Number 1, 1965, at pages 25-30, describes the basic vector generator which is employed in most graphics display systems.

However, the article does not teach the method for transforming, clipping and mapping graphics data in accordance with the present invention.

An article entitled "The Design and Implementation of the GINO 3D Graphics Software Package" By P. A. Woodsford, Software Practice and Experience, Volume 1, pages 335-365, published by John Wiley and Sons, Ltd., 1971, discusses a general purpose graphics software package which provides coordinate transformation and data clipping.

However, the system discussed in the paper does not teach a method for transformation, clipping and mapping of graphics data in accordance with the present invention.

An article entitled, "The Adage Graphics Terminal" by Hagan, et. al., published in the Conference Proceedings of the Fall Joint Computer Conference, 1968, describes another prior art design which includes apparatus and method for performing coordinate transformation and image data clipping.

However, the article does not teach the method for transforming, clipping and mapping graphics data in accordance with the present invention.

An article entitled "A Clipping Divider" by Sproull and Sutherland, published in the Conference Proceedings, Fall Joint Computer Conference, 1968, at pages 42-52, shows a technique for clipping graphics data against a predetermined clipping window.

However, the article does not teach the method for transforming, clipping and mapping graphics data in accordance with the present invention.

SUMMARY OF THE INVENTION

Therefore, it is an object of the present invention to control transformation, clipping and mapping in a graphics display system by method and apparatus including means for determining the number of dimensions of a figure to be displayed; means for determining whether a figure is to be transformed; means for transforming said figure, means for determining whether said figure is to be clipped against a predetermined clipping enclosure; means for determining whether said figure is to be displayed as a perspective view; means for clipping said figure; means for determining whether said figure is to be mapped to a view port; means for mapping said figure to said view port; and means for drawing said figure as a series of vectors for display on a display device.

Accordingly a display processor in a raster graphics display system includes means for transformation, clipping and mapping which control the transformation, clipping and mapping of graphics data. A control byte contains 5 bits identified as: M-Window to viewpoint mapping; P-perspective projection; D—2D/3D mode; T-transformation; and C-clipping. Each bit in the control byte is tested to determine what operations are to be performed on the figure to be drawn. For example, if the D bit is one, indicating a three dimensional figure and the T bit is one, indicating transformation, and the C bit is one, indicating clipping, the P bit determines whether the clipping will be perspective or non-perspective clipping and the M bit determines whether the figure to be drawn is to be mapped to the view port.

The foregoing and other objects, features and advantages of the invention will be apparent from the more particular description of the preferred embodiments of the invention, as illustrated in the accompanying drawing.

BRIEF DESCRIPTION OF THE DRAWINGS

FIG. 5, which includes

In the drawing, like elements are designated with similar reference numbers, and identical elements in different specific embodiments are designated by identical reference numbers.

DESCRIPTION OF PREFERRED EMBODIMENTS OF THE INVENTION

Introduction

Figure 1:
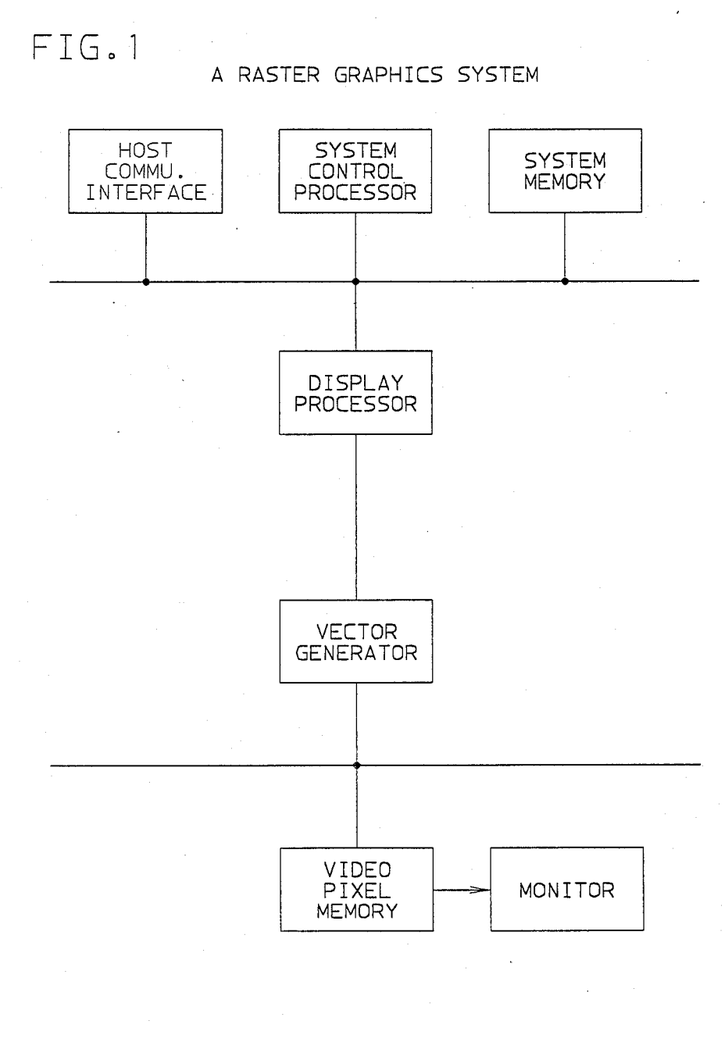
FIG. 1 is a block diagram of a raster graphic system for performing the method of the present invention.
Figure 2:
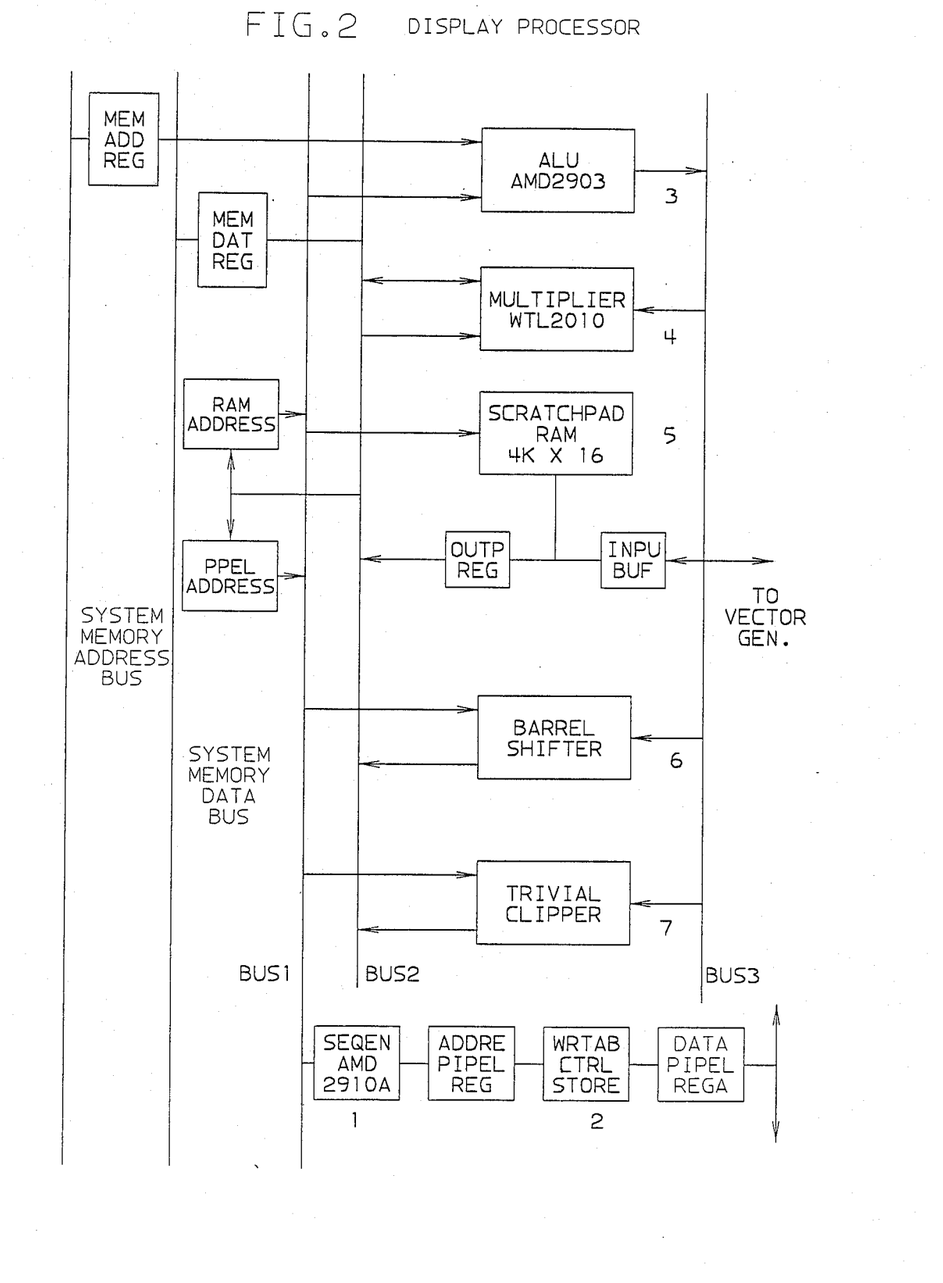
FIG. 2 is a display processor portion of the raster graphic system shown in FIG. 1 for performing the method according to the present invention.
Figure 3:
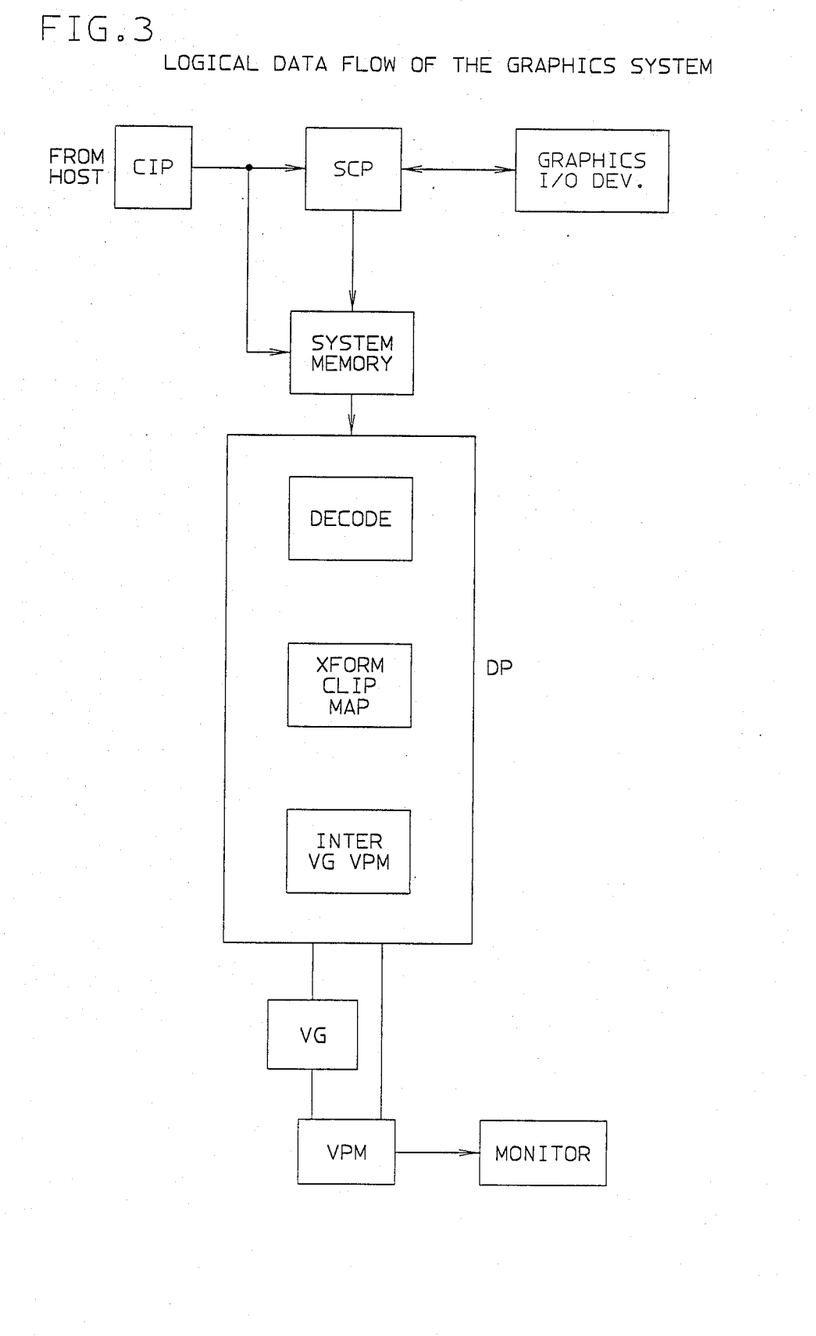
FIG. 3 is a block diagram of logical data flow for the graphics system shown in FIG. 1.

Referring now to FIGS. 1 and 2, a Graphics Display Processor which forms part of a Graphics raster Display System will be described.

Geometric primitives, such as vectors (lines), markers, or polygons (or equivalently, the vertices of polygons); are transformed, clipped and mapped by the method and apparatus according to the present invention.

THE TRANSFORMATION AND CLIPPING FEATURE FOR A GRAPHICS SYSTEM

A Graphics Display Processor for Transformation and Clipping will now be discussed.

The Graphics Display Processor (see FIG. 2) forms part of a Graphics Raster Display System, see FIG. 1.

For geometric primitives, such as vectors (lines), markers, or polygons (or equivalently, the vertices of polygons); they go through the transformation-clipping-mapping process.

A RASTER GRAPHICS SYSTEM

Consider the raster graphics system shown in FIG. 1. It consists of the following major components.
1. System Control Processor
2. Host Communication Interface Processor
3. Display Processor
4. Hardware Rasterizer—Vector Generator
5. Hardware Character Generator
6. Video Pixel Memory
7. System Memory

FUNCTIONS OF MAJOR COMPONENTS

Each of the major components to be described may be implemented by elements of commercially available display systems such as the IBM 5080.

1. System Control Processor

The System Control Processor is a general purpose processor that has master control of the System. The System Control Processor is responsible for servicing all attached Graphics I/O devices Coordinating the associated processing with the Display Processor The System Control Processor interfaces with the host via Host Communication Interface 2. Host Communication Interface The Host Communication Interface provides the serial interface of the System to the host.

3. Display Processor

The DP is responsible for executing graphics orders in the Display Storage Program, residing in the system memory and is concerned mainly with the generation of the image that will appear on the Display Monitor. It has the following functions:

Decoding graphics orders and executing non-drawing orders; e.g. bookkeeping and control.

Performing the transformation and clipping function to the geometric primitives: lines, characters, polygons, etc.

Preparing the following geometric objects for display: lines, characters, markers, filled polygons, by preprocessing and feeding the data to the Vector generator and Video Pixel Memory 4. Vector generator Vector generator is a Hardware Implementation of the Bresenham Line Generating algorithm, which takes the end points of a vector (line) as input, and generates pixels in the Video Pixel Memory as output for display.

5. Video Pixel Memory

Video Pixel Memory consists of 8 1k by 1k bit planes, which supports 256 colors simultaneously via color look-up tables. The image stored here will be displayed in the Monitor.

TRANSFORMATION AND CLIPPING

The transformation and clipping method according to the present invention is controlled by the contents of an Attribute Register, which consist of 5 active bits in an 8 bit byte as follows:

00MPTDC0

Where:
M = WINDOW-TO-VIEWPORT MAPPING
P = PERSPECTIVE PROJECTION (C-BIT MUST BE 1)
D = 2D or 3D MODE (0 = &Ar.2D, 1 = &Ar.3D)
T = TRANSFORMATION
C = CLIPPING

THE LOGICAL SEQUENCE IS

IF THE D-BIT  =  0
                      /* 2D MODE */

THEN DO
 (1) PERFORM TRANSFORMATION IF THE T-BIT = 1
 (2) PERFORM 2D CLIPPING IF THE C-BIT = 1
 (3) PERFORM MAPPING IF THE M-BIT = 1
 (4) DRAW THE VECTOR COMPUTED BY THE ABOVE STEPS
 (5) RETURN TO THE VECTOR DRAWING ORDER.

/* 3D MODE */

ELSE DO
 (1) PERFORM TRANSFORMATION IF THE T-BIT = 1
 (2) IF THE C-BIT IS 1,
     PERFORM PERSPECTIVE CLIPPING IF THE P-BIT IS 1
     PERFORM REGULAR 3D CLIPPING IF THE P-BIT IS 0
 (3) PERFORM MAPPING IF THE M-BIT = 1
 (4) DRAW THE VECTOR COMPUTED BY THE ABOVE STEPS
 (5) RETURN TO THE VECTOR DRAWING ORDER.

Figure 4:
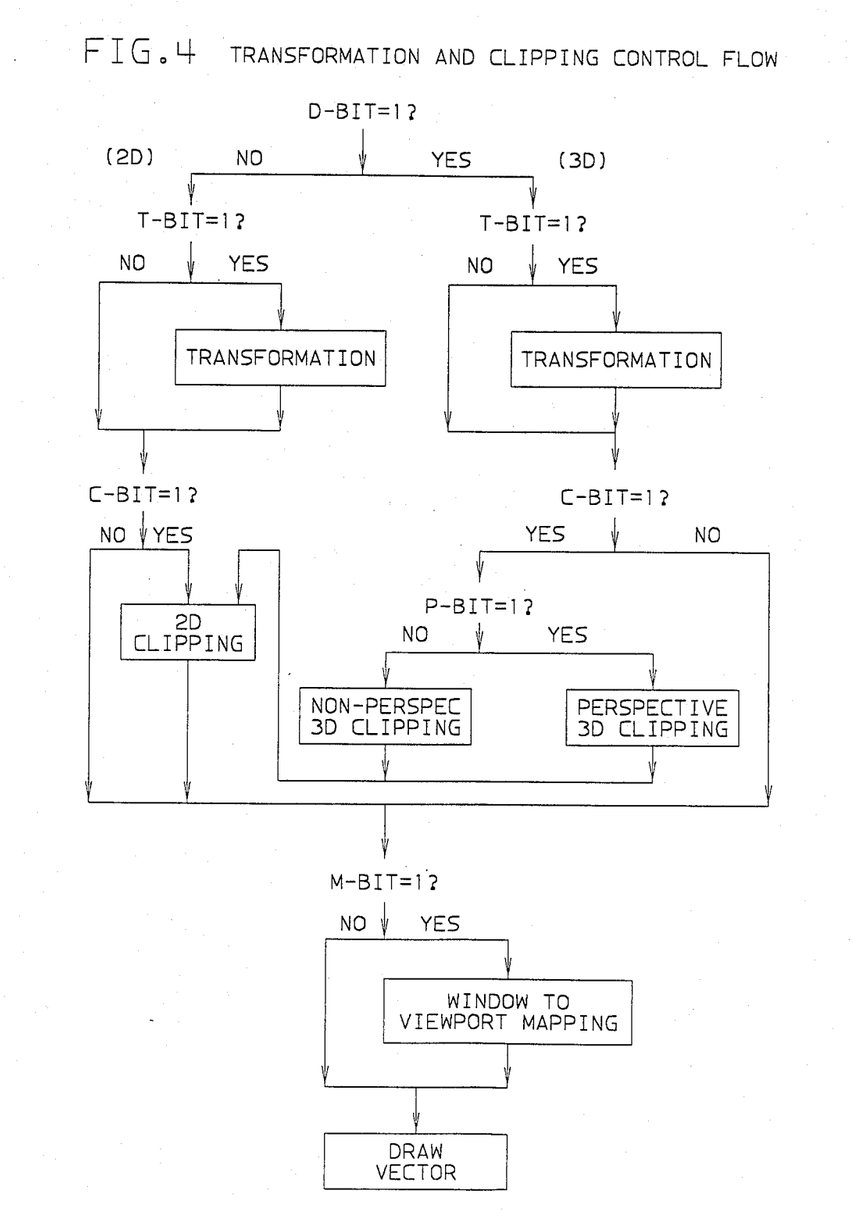
FIG. 4 is a flow chart showing the transformation, clipping and mapping method in accordance with a preferred embodiment of the present invention.

The flow chart for control of the method according to the present invention is shown in FIG. 4.

In the following, a vector (line) will be used as an example:

There are three stages:
1. transformation
   for the end points of a vector, which is in the 16-bit fixed number format, the matrix multiplication is done in the (−32k, 32k−1), 16-bit x,y, and z space.
2. clipping
   using the two end points of a vector (line) and clip to the clipping box specified by the user.
   the computation is done in 16-bit space
3. mapping
   mapping the contents inside the clipping box (in 3D) or clipping window (in 2D) to a viewpoint in the screen specified by the user.

The screen coordinate is (0,4k−1) by (0,4k−1), which then mapped to the 1k by 1k screen.

For the transformation matrix
m11 m12 m13 m21 m22 m23
m31 m32 m33
m41 m42 m43

The first nine terms are in the 16-bit fraction format; and the last three are in the 16-bit integer format.

Furthermore, there is a shift factor, ss ($0 <= ss <= 12$), which is the common exponent for the first 9 terms.

Because the subtraction of two 16-bit numbers may yield a 17-bit number (that is, an overflow), the following number formats are used.

1. Input to the matrix multiplication is a 16-bit number.
2. By shifting to the right, the output from the matrix multiplication (transformation stage), and hence, the input to the clipping stage, is a 15-bit number.
3. The output from the clipping stage, and input to the mapping stage is a 15-bit number.
4. The output from the mapping stage, and input to the drawing stage is a 14-bit number (actually between 0 and 1k).

DISPLAY PROCESSOR (SEE FIG. 2)

The Display Processor is a microprogrammed system. It fetches the data from the memory and sends the data out to the raster display via the Vector Generator, which is a rasterizer. It takes the line segment end points coordinates as input, and generates pixels in the video pixel memory.

The main ingredients of the system are
1. sequencer, e.g. AMD2910A;
2. 72-bit wide writable control store;
3. 16-bit ALU, e.g. 4 bit-slice AMD2903;
4. a 16×16 multiplier with 32-bit accumulator, e.g. WTL2010;
5. a 32-bit barrel shifter;
6. a trivial clipper (for checking trivial accept/reject);
7. 4k×16 scratch ram;
8. logic for microcode next address coming from the content of scratchpad ram registers—indexed addressing.

CONTROL OF TRANSFORMATION AND CLIPPING

The first step is to pre-load the branch addresses used in the control flow (FIG. 4) into registers. This is done when the attribute register is loaded by the user. When a vector is processed, the logic in the hardware items in #8 in the last section will set up the branching addresses, which
eliminates the decision making process for each vector; and
eliminates the need for 'return' instructions in subroutines.

Figure 5A:
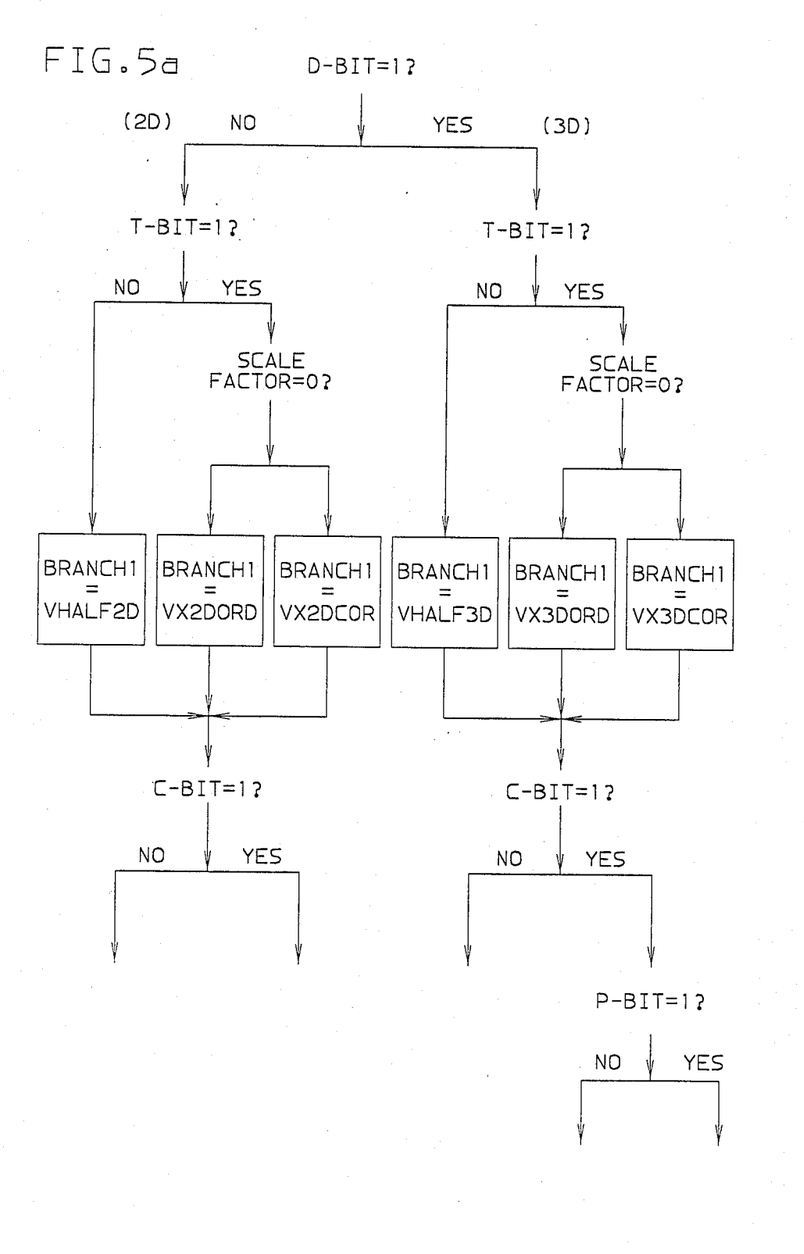
FIGS. 5a and 5b, is a logical flow chart showing loading of exit registers in accordance with a preferred embodiment of the present invention.
Figure 5B:
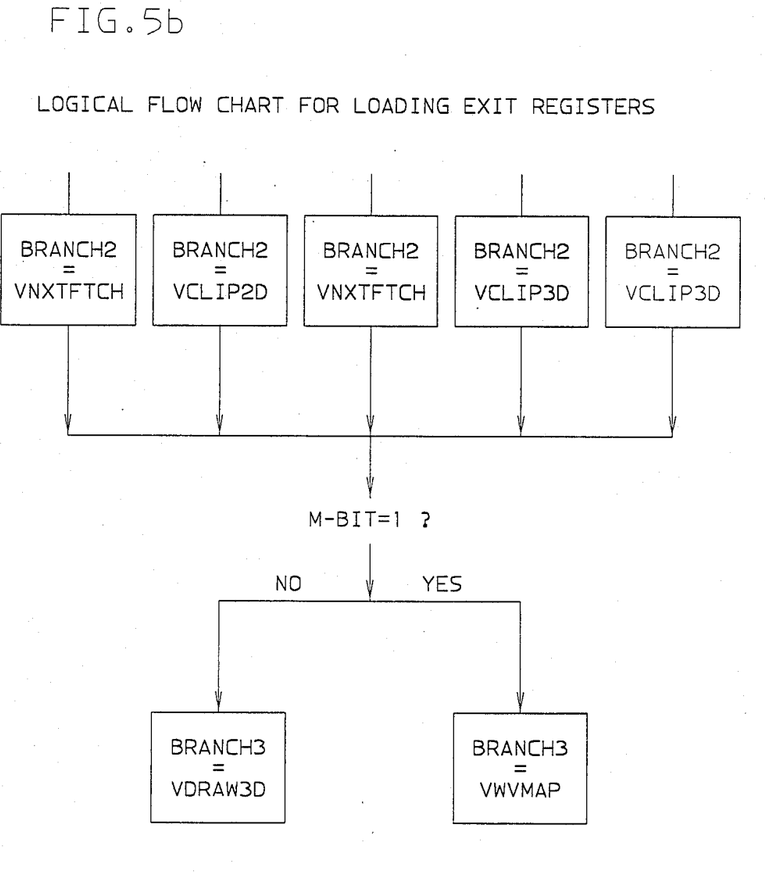

When attribute register is loaded, the branch addresses for chaining the transformation subroutines together may be loaded into the exit registers. In our system, three registers (BRANCH1, BRANCH2, and BRANCH3) are used for this purpose, while a fourth register (BRANCH4) is used to return from the vector drawing subroutine to the code that prepares the data for the next vector. A flow chart for loading the exit registers based on the bits in AR is shown in FIG. 5.

These registers are described in the section below about Subroutine Exit Registers.

VECTOR DRAWING ORDER

In this section, the drawing orders are discussed. GDLR3 as an example:

The order GDLR3 is followed by a data list of (x,y,z) coordinates, x'2AA3' (GDLR3)
x1
y1
z1
x2
y2
z2
.
.
.
xn
yn
zn The coordinates of each of the n points are of the form 0b0sxxxxxxxxxxxx    X1

000syyyyyyyyyyyy    Y1

000szzzzzzzzzzzz    Z1 where
s is the sign bit for the 2's complement number;
b is the blanking bit,
1. if it is '1', then it is a *move;* and moves to the new current position;
the current position is the old current position (X0,Y0,Z0) plus (X1,Y1,Z1), the given relative coordinate.
2. if it is '0', then it is a *draw;* and draw from the old current position (X0,Y0,Z0) to the new one-(X0,Y0,Z0) plus (X1,Y1,Z1), the given relative coordinate.

PRE-FETCHING DATA IN THE TC LOOP

As shown in section one, the operation for processing a point (x,y,z) following a GDLR3 order consists of the following 3 steps:
1. GDLR3 preprocessing loop—formatting the coordinate data into 16-bit numbers (bookkeeping);
2. TC (transformation and clipping) which consists of the following 3 stages:
   a. transformation (matrix multiplication);
   b. clipping;
   c. mapping.
3. Drawing the transformed-clipped-mapped vector.

In the past, the memory fetches for the 3 data words were done in step 1, the GDLR3 pre-processing loop. To gain performance by overlapping memory fetches with data processing, now interleave the three memory fetches with the TC processing (issue a read for the first data word before entering TC; receive the first data word and issue a read for the second data word during the transformation stage; and receive the second data word and issue a read for the third data word during the clipping stage).

The first and second data words (x and y) are stored in scratch pad ram during the TC process.

The memory reads are done in the matrix transformation and clipping stages (this is done to ensure that both reads have been issued in the case where mapping is bypassed because a point is rejected).

If either the matrix transformation or clipping bit is not on, an alternative subroutine is used to fetch the data instead of the transformation or clipping which was bypassed (see descriptions of subroutines VHALF2D, VHALF3D, and VNXTFTCH in the next section).

For the above reasons, after the first vector is processed by the TC code, the subroutine that does the GDLR3 data preprocessing for subsequent vectors obtains its x and y data from scratch pad ram, and its z data is already in the memory receive register. There is no need to wait for a memory fetch to complete before re-entering the TC process for the next vector.

Figure 7:
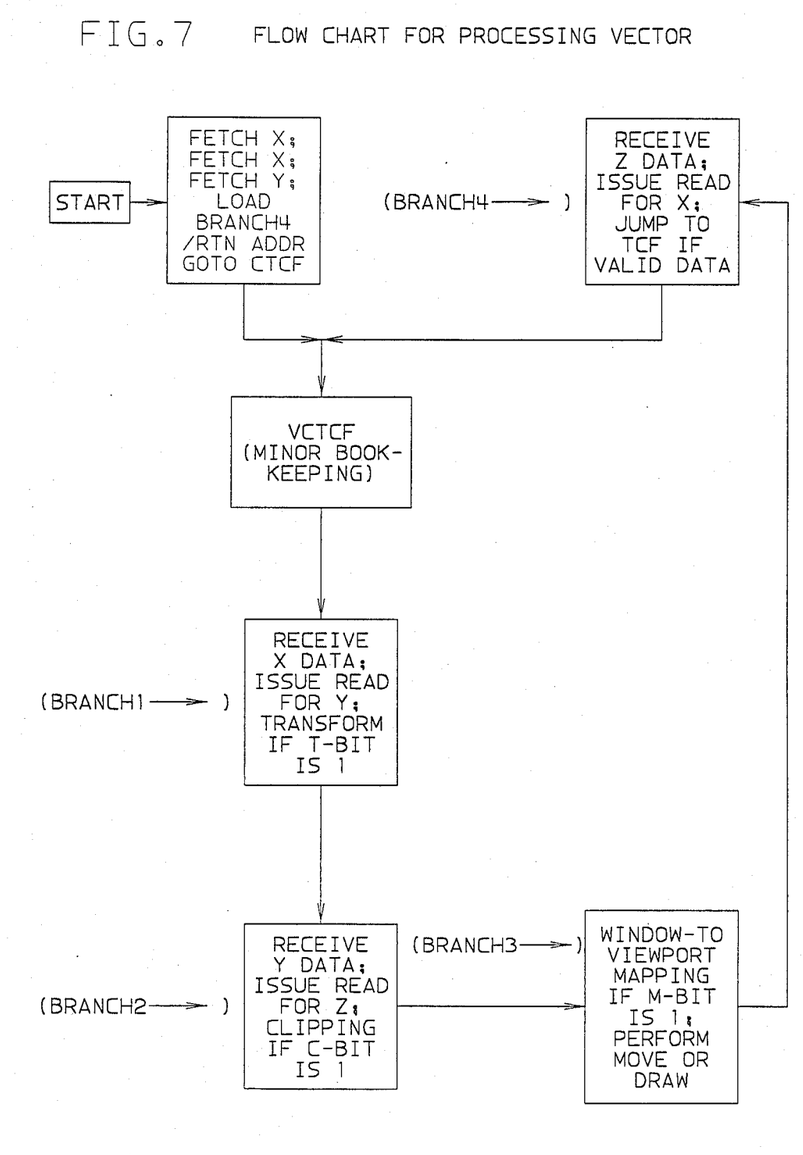
FIG. 7 is a flow chart for processing a vector in accordance with a preferred embodiment of the present invention.

See FIG. 7.

LOGICAL FLOW OF TC

Figure 6:
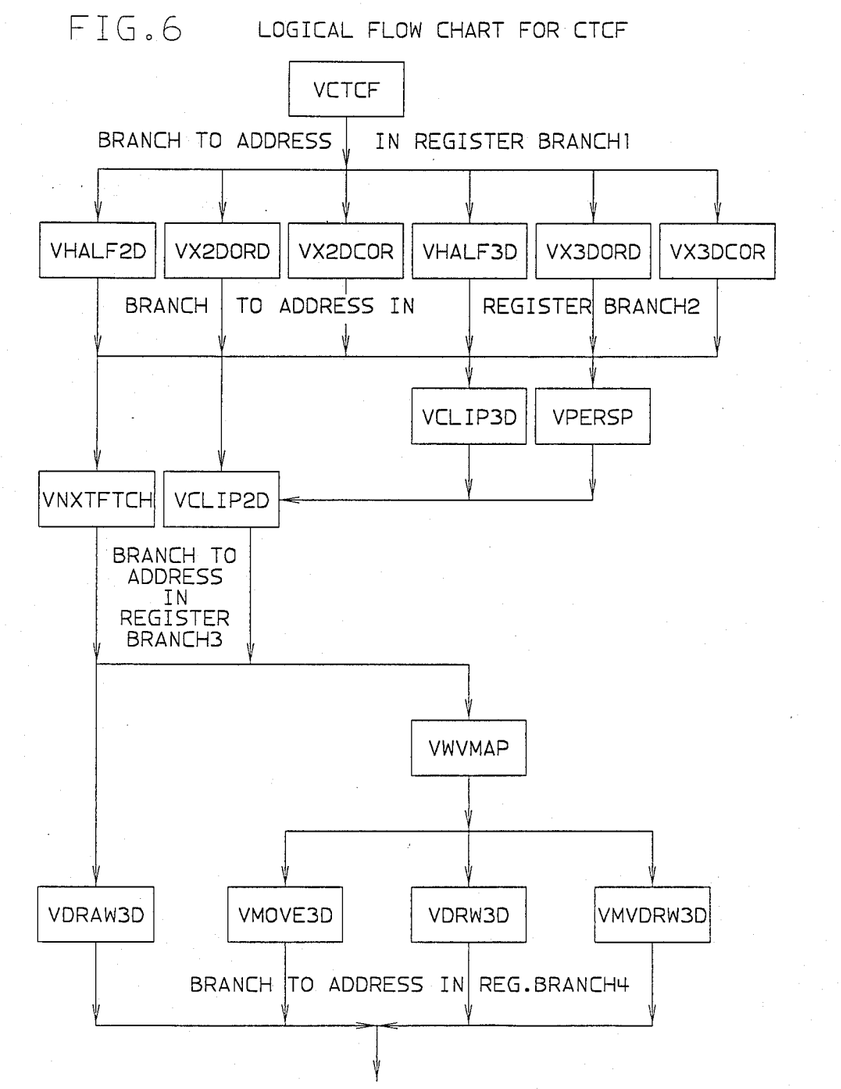
FIG. 6 is a logic flow chart for transformation, clipping and mapping of a vector in accordance with a preferred embodiment of the present invention.

The logical flow chart for TC processing of a vector according to a preferred embodiment of the present invention is shown in FIG. 6.

The following is a list of subroutine labels:

1. VCTC—This subroutine is the entry point used whenever any CTC function (transformation, clipping, or mapping) is specified. It records the pre-transformed coordinate values for later use, and remembers the post-transformed coordinate values for the the last point to use CTC.
2. VX3DCOR—This subroutine performs the 3D matrix transformation in the case where the scale factor is non-zero. In the process of doing this, it converts the x, y, and z coordinates from 16 bit quantities to 15 bit quantities. It also receives the x-coordinate of the next point from memory, and issues a read for the y-coordinate.
3. VX3DORD—This subroutine performs the 3D matrix tranformation in the case where the scale factor is zero. In the process of doing this, it converts the x, y, and z coordinates from 16 bit quantities to 15 bit quantities. It also receives the x-coordinate of the next point from memory, and issues a read for the y-coordinate.
4. VX2DCOR—This subroutine performs the 2D matrix transformation in the case where the scale factor is non-zero. In the process of doing this, it converts the x and y coordinates from 16 bit quantities to 15 bit quantities. It also receives the x-coordinate of the next point from memory, and issues a read for the y-coordinate.
5. VX2DORD—This subroutine performs the 2D matrix transformation in the case where the scale factor is zero. In the process of doing this, it converts the x and y coordinates from 16 bit quantities to 15 bit quantities. It also receives the x-coordinate of the next page point from memory, and issues a read for the y-coordinate.
6. VHALF3D—This subroutine is entered in the case where 3D mode was specified and transformation was not specified. It converts the x, y, and z coordinates from 16 bit quantities to 15 bit quantities by dividing them in half. It also receives the x-coordinate of the next point from memory, and issues a read for the y-coordinate.
7. VHALF2D—This subroutine is entered in the case where 2D mode was specified and transformation was not specified. It converts the x and y coordinates from 16 bit quantities to 15 bit quantities by dividing them in half. It also receives the x-coordinate of the next point from memory, and issues a read for the y-coordinate.
8. VCLIP3D—This subroutine performs the z-clipping for the 3D non-perspective clipping. When this is completed, it exits to the 2D clipping routine (VCLIP2D) to perform the x and y clipping.
9. VPERSP—This subroutine performs the z-clipping for the 3D perspective clipping. When this is completed, it exits to the 2D clipping routine (VCLIP2D) to perform the x and y clipping.
10. VCLIP2D—This subroutine performs the 2D clipping. It also receives the y-coordinate of the next point from memory, and issues a read for the next piece of data (in the case of GDLR3, the z-coordinate).
11. VNXTFTCH—This subroutine is entered in the case where no clipping was specified. It receives the y-coordinate of the next proint from memory, and issues a read for the next piece of data (in the case of GDLR3, the z-coordinate).
12. VWVMAP—This subroutine performs the window-to-viewport mapping function. If the previous point was clipped, it maps both end points of the current vector; it the previous point was not clipped, only the latest point of the current vector is mapped.
13. VDRAW3D—This subroutine handles moves and draws in the case when no mapping was specified. It either causes a move or a "move-then-draw" to be done, based on whether blanking was specified or not.
14. VMOVE3D—This subroutine performs the move needed in the case when mapping is in effect and blanking was specified.
15. VDRW3D—This subroutine draws the vectors in the case when mapping is in effect, blanking was not specified, and the previous point was not clipped. In this case, there is no need to do a move before drawing (the current draw position of the vector generator is the desired starting position for the vector), so this routine only does a draw.
16. VMVDRW3D—This subroutine handles drawing in the case when mapping is in effect, blanking was not specified, and the previous point was clipped. In this case, it is necessary to do a move before drawing (the current draw position of the vector generator is not the desired starting point for the vector), so this routine only does a "move-then-draw" operation.

SUBROUTINE EXIT REGISTERS

Each individual subroutine exits to the address contained in a register which is preloaded during the loading of attribute register.

The exit registers for the above individual subroutines are

1. VCTC—BRANCH1
2. VX3DCOR—BRANCH2
3. VX2DCOR—BRANCH2
4. VHALF3D—BRANCH2
5. VHALF2D—BRANCH2
6. VCLIP3D—exits to entry point in VCLIP2D
7. VPERSP—exits to entry point in VCLIP2D
8. VCLIP2D—BRANCH3
9. VNXTFTCH—BRANCH3
10. VWVMAP—exits to one of three "drawing" routines (VMOVE3D, VDRW3D, or VMVDRW3D)

11. VDRAW3D—BRANCH4 (return to vector processing code)
12. VMOVE3D—BRANCH4 (return to vector processing code)
13. VDRW3D—BRANCH4 (return to vector processing code)
14. VMVDRW3D—BRANCH4 (return to vector processing code)

The following table shows the different branching addresses loaded into the exit registers when the GLATR order is executed for attribute register.

| AR MPTC | branch reg1 | branch reg2 | branch reg3 |
|---------|-------------|-------------|-------------|
| Cases where D = 0: | | | |
| 0010 | VX2DCOR | VNXTFTCH | VDRAW3D |
| 0001 | VHALF2D | VCLIP2D | VDRAW3D |
| 1000 | VHALF2D | VNXTFTCH | VWVMAP |
| 0011 | VX2DCOR | VCLIP2D | VDRAW3D |
| 1010 | VX2DCOR | VNXTFTCH | VWVMAP |
| 1001 | VHALF2D | VCLIP2D | VWVMAP |
| 1011 | VX2DCOR | VCLIP2D | VWVMAP |
| Cases where D = 1: | | | |
| 0010 | VX3DCOR | VNXTFTCH | VDRAW3D |
| 0010 | VX3DCOR | VNXTFTCH | VDRAW3D |
| 0001 | VHALF3D | VCLIP3D | VDRAW3D |
| 1000 | VHALF3D | VNXTFTCH | VWVMAP |
| 0011 | VX3DCOR | VCLIP3D | VDRAW3D |
| 1010 | VX3DCOR | VNXTFTCH | VWVMAP |
| 1001 | VHALF3D | VCLIP3D | VWVMAP |
| 1011 | VX3DCOR | VCLIP3D | VWVMAP |
| 0101 | VHALF3D | VPERSP | VDRAW3D |
| 0111 | VX3DCOR | VPERSP | VDRAW3D |
| 1101 | VHALF3D | VPERSP | VWVMAP |
| 1111 | VX3DCOR | VPERSP | VWVMAP |

Examples of exit register usage:

If only 2d transformation with non-zero scale factor is required, the exit registers are loaded as follows:
1. address of VX2DCOR in BRANCH1;
2. address of VNXTFTCH in BRANCH2;
3. address of VDRAW3D in BRANCH3;
4. BRANCH4 is loaded with the address of the loop for processing vectors whose coordinate data have been pre-fetched by the previous use of CTC code.

For 3D transferred, clipped (non-perspective clipping), and mapped vectors, the exit registers are loaded as follows:
1. address of VX3DCOR in BRANCH1;
2. address of VCLIP3D in BRANCH2;
3. address of VWVMAP in BRANCH3;
4. BRANCH4 is loaded with the address of the loop for processing vectors whose coordinate data have been pre-fetched.

see FIGS. 6 and 7.

Thus, while the invention has been described with reference to preferred embodiments thereof, it will be understood by those skilled in the art that various changes in form and details may be made without departing from the scope of the invention.

What is claimed is:

1. A display processor for selectively providing transformation, clipping and mapping processes in a graphics display system comprising, in combination;
   a plurality of registers for storing branch addresses relating to said transformation, clipping and mapping processes;
   one of said registers being associated with each of said processes,
   means for branching to the value of one of said registers in accordance with the process being performed;
   means for determining the dimensions of a figure to be displayed;
   means for determining whether said figure is to be transformed;
   means for providing transformation of said figure;
   means for determining whether said figure is to be clipped against a predetermined clipping enclosure;
   means responsive to said last named determining means for clipping said figure against said predetermined clipping enclosure; and
   means for drawing said figure as a series of vectors for display on a display device in said graphic display system whereby the control decision for selective transformation, clipping and mapping processes is performed only when the transformation, clipping and mapping parameters are modified.

2. Apparatus according to claim 1, further comprising:
   means for determining whether said figure is to be displayed as a perspective view.

3. Apparatus according to claim 1, further comprising:
   means for determining whether said figure is to be mapped to a view port; and
   means for mapping said figure to said view port.

4. Apparatus according to claim 1 wherein each of said plurality of determining means comprises input data responsive means.

5. Apparatus according to claim 1 wherein said means for transforming, clipping and drawing said figure comprise microcode control means.

6. In a graphics display system, a method for selectively controlling tranformation, clipping, mapping and drawing of a figure comprising the steps of:
   determining the dimensions of a figure to be displayed;
   determining whether said figure is to be transformed;
   determining whether said figure is to be clipped against a predetermined clipping enclosure;
   determining whether said figure is to be mapped;
   said determining steps being performed whenever the associated operations are specified; in an attributed register; and
   selectively transforming, clipping, mapping and drawing vector coordinates of said figure to be mapped without any other than with only the original specified condition of the said determining steps whenever a command to draw vector coordinates of said figure is executed.

7. A method according to claim 6, further comprising the step of:
   determining whether said figure is to be displayed as a perspective view.

* * * * *